(12) United States Patent
Jeng et al.

(10) Patent No.: US 7,861,612 B2
(45) Date of Patent: Jan. 4, 2011

(54) TRANSMISSION RANGE SHIFT CONTROL WITH NEUTRAL POSITION LOCK

(75) Inventors: Kuan-Jen Jeng, Kalamazoo, MI (US);
Mark A. Hirsch, Vicksburg, MI (US);
Thomas N. Riley, Kalamazoo, MI (US);
C. David Bradley, Gobles, MI (US)

(73) Assignee: Eaton Corporation, Cleveland, OH (US)

( * ) Notice: Subject to any disclaimer, the term of this patent is extended or adjusted under 35 U.S.C. 154(b) by 863 days.

(21) Appl. No.: 11/731,943

(22) Filed: Apr. 2, 2007

(65) Prior Publication Data
US 2008/0236322 A1 Oct. 2, 2008

(51) Int. Cl.
*F16H 59/00* (2006.01)
*F16H 61/16* (2006.01)
(52) U.S. Cl. .............................. 74/335; 477/125
(58) Field of Classification Search ................... 74/335; 477/125, 127; 701/62
See application file for complete search history.

(56) References Cited

U.S. PATENT DOCUMENTS

| | | | |
|---|---|---|---|
| 2,654,268 A | 10/1953 | Perkins | |
| 3,138,965 A | 6/1964 | Brey | |
| 4,060,005 A | 11/1977 | Bost | |
| 4,974,474 A | 12/1990 | Newbigging | |
| 5,199,311 A * | 4/1993 | Muyskens et al. | 74/335 |
| 5,216,931 A | 6/1993 | Hirsch et al. | |
| 5,222,404 A * | 6/1993 | Stine | 74/335 |
| 5,263,379 A * | 11/1993 | Newbigging et al. | 74/336 R |
| 6,324,928 B1 * | 12/2001 | Hughes | 74/335 |
| 6,339,973 B1 | 1/2002 | Monette | |
| 6,935,474 B2 | 8/2005 | Bell et al. | |
| 2002/0029645 A1 * | 3/2002 | Jackson et al. | 74/335 |

* cited by examiner

*Primary Examiner*—Roger Pang
(74) *Attorney, Agent, or Firm*—Kevin M. Hinman (57) ABSTRACT

A range selection control system for a transmission facilitates safe operation of a power take off. A fluid actuated range piston assembly within a range cylinder moves between low range and high range positions. Range cylinder and range piston assembly define sealed high range and low range chambers. A neutral cylinder intersects range cylinder. A fluid actuated neutral piston assembly within neutral cylinder defines a neutral chamber. Neutral piston assembly engages range control piston assembly responsive to pressurization of neutral chamber. Neutral piston assembly is received by an engagement feature of range piston assembly when range control piston assembly is in a neutral position, retaining range piston assembly there. An electrically responsive locking mechanism locks neutral piston assembly in place when range piston assembly is in the neutral position. The locking is controlled by a condition of an electrical switch indicating a transmission condition.

8 Claims, 10 Drawing Sheets

FIG 9

TRANSMISSION RANGE SHIFT CONTROL WITH NEUTRAL POSITION LOCK

TECHNICAL FIELD

The technical field is generally control systems for shifting the auxiliary sections of compound transmissions, and particularly, pneumatic control and interlock systems for a range type compound transmission.

BACKGROUND

Compound transmissions of the range or combined range/splitter type are well known in the prior art. Such transmissions typically comprise a multiple speed main transmission section connected in series with a range type auxiliary section wherein the range step is greater than the total ratio coverage of the main transmission section. Power Take-Off (PTOs) are commonly mounted to the exterior of compound transmissions over an opening in the transmission housing which enables engagement of a transmission gear with a gear in the PTO. PTOs enable directing the power of a truck's engine to auxiliary equipment to perform work at a work site while the truck is stationary. To drive a PTO that is in driving engagement with the range section counter-shaft a main section much have a predetermined main section drive gear engaged. To permit the PTO to be safely operated while the truck is stationary, the range section is placed in a neutral condition.

In compound transmissions, the main section is typically shifted by means of a shift housing assembly controlled by a manually operated shift lever or the like. In contrast, the auxiliary range section is shifted by means of a switch. A switch operated by the operator, either directly or indirectly through the shift linkage and a main section shift mechanism, controls a remote slave valve/actuator mechanism. The valve/actuator mechanism controls operation of a range actuator. The range actuator includes a fluid-actuated piston that divides an actuator cylinder into a low-range and a high-range chamber. The piston moves in response to selective pressurization of one chamber while simultaneously exhausting the other chamber. Since the range section often utilizes synchronized jaw clutches, a range shift is preferably initiated and completed while the main transmission section is in neutral, to provide acceptable shift quality and to prevent undue wear and/or damage to the synchronized jaw clutches.

The neutral condition for the range unit is selected by the vehicle operator when the operator moves a pneumatic switch-valve assembly from a "mobile" position to a "stationary" position.

Prior art compound range type transmissions usually include a control system, which is typically a pneumatic control system having interlock devices, that allows a range shift to be preselected using a selector button or switch at a master control valve. To prevent damage to the jaw clutches, the control system prevents shift initiation of the auxiliary section until the main transmission section is shifted to, or at least towards, the neutral condition. Examples of such transmissions and the control systems therefor may be seen by reference to U.S. Pat. Nos. 2,654,268; 3,138,965, 4,060,005 and 4,974,474. Prior art systems also ensure operator safety by maintaining range unit in a neutral condition while the PTO is operating.

In such transmissions, it is desired to provide a control system which is both highly reliable in maintaining the range section in neutral, at a low component cost.

SUMMARY

An embodiment provides a range selection control system for a multispeed compound transmission facilitating the safe engagement and disengagement and operation of a power take off. The system has both fluid control elements and electrical control elements for use with a source of pressurized fluid and electrical power. A range cylinder has a range cylinder first end and a range cylinder second end. A fluid actuated range piston assembly is slideably disposed within the range cylinder for movement between a low range position at the first end of the range cylinder and a high range position at the second end of the range cylinder. The range piston assembly also has a range engagement feature. The range cylinder and the range piston assembly together define a sealed high range chamber between the first end of the range cylinder and a first surface of the piston assembly and also defines a sealed low range chamber between the second end of the range cylinder and a second side of the piston assembly. A neutral cylinder intersects the range cylinder and has a first neutral cylinder end opposite the range cylinder. A fluid actuated neutral piston assembly is slideably disposed within the neutral cylinder and defines a neutral chamber between the first neutral cylinder end and a neutral piston assembly end facing the first neutral cylinder end. The neutral piston assembly engages the range control piston assembly responsive to pressurization of the neutral chamber. The neutral piston assembly is received at least in part by the engagement feature when the range control piston assembly is in a neutral position between the low range position and the high range position. The neutral piston assembly and neutral the cylinder together retain the piston assembly in the neutral position. An electrically responsive locking mechanism is in selective locking engagement with the neutral piston assembly when the neutral piston assembly is received by the range engagement feature. The selective locking engagement is controlled by a condition of an electrical switch indicative of a transmission condition.

With the range piston assembly held in neutral by the neutral piston assembly, and the neutral piston assembly held in neutral by the electrically responsive locking mechanism, the PTO can be operated without fear of the range section slipping into gear. The use of both pneumatic and electrical elements enables high system reliability at a cost lower than that of a prior art system providing comparable protection. This makes is possible to provide very safe range control systems to cost sensitive markets.

DETAILED DESCRIPTION

Figure 1:
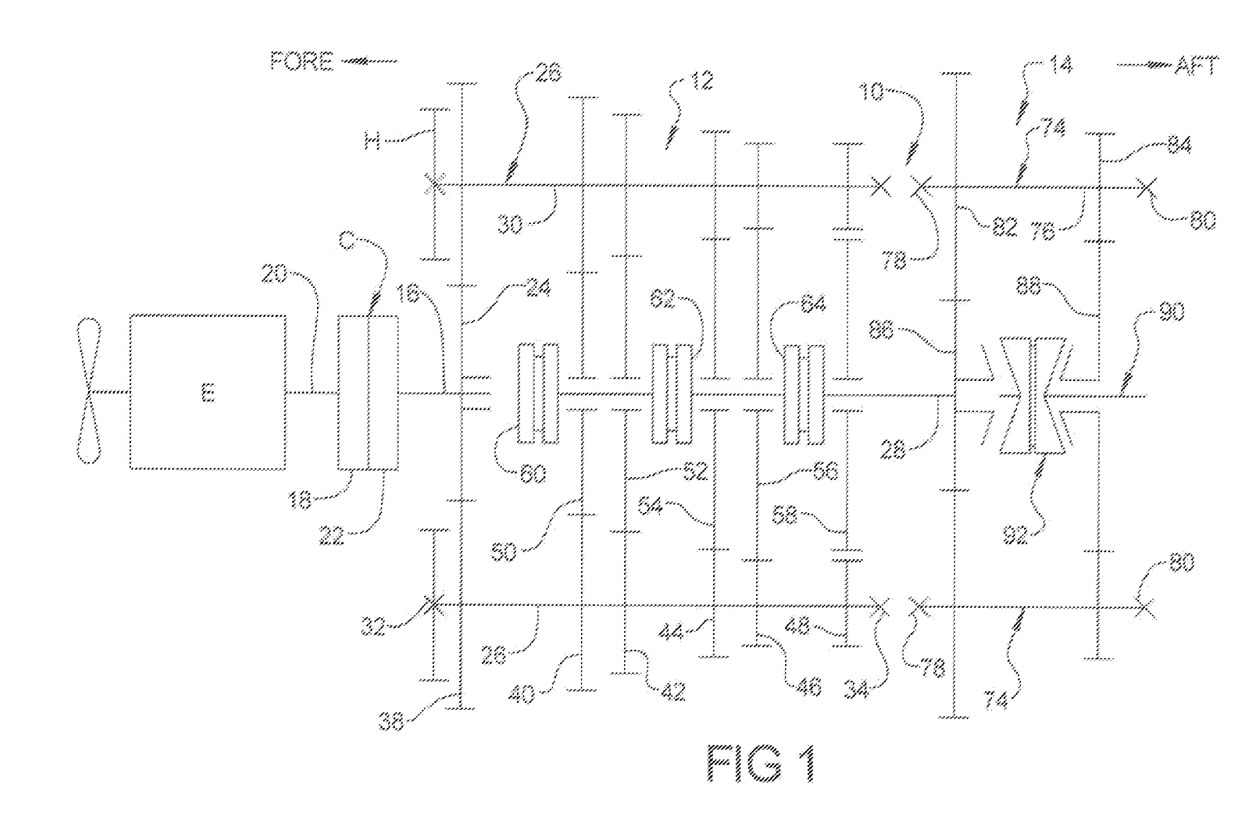
FIG. 1 is a schematic illustration, not to scale, of a compound transmission having a range type auxiliary section and utilizing the pneumatic control system.
Figure 2:
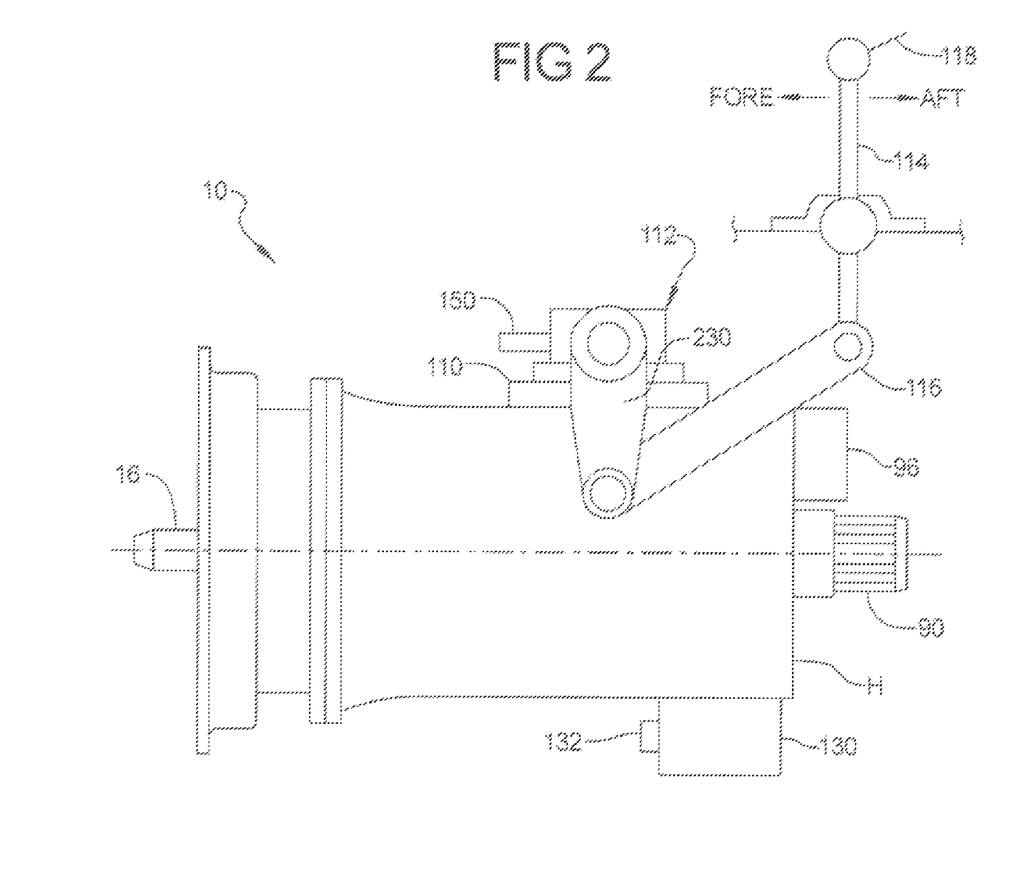
FIG. 2 is a schematic illustration of the exterior components of the shift mechanism of the transmission of FIG. 1.
Figure 3:
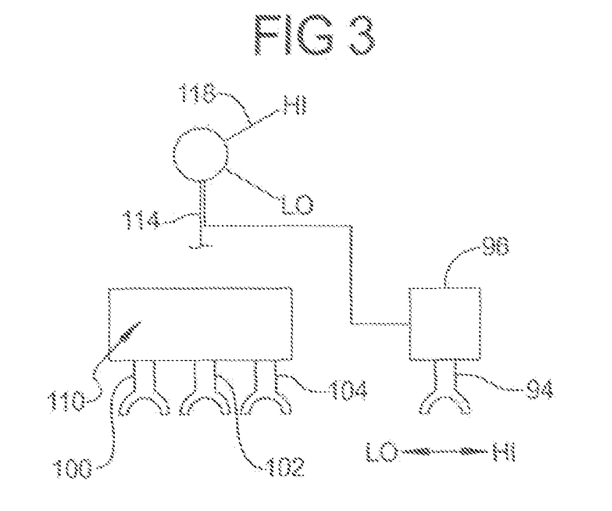
FIG. 3 is a schematic illustration of a second embodiment of the shift housing element of the main section and the range actuator assembly of the transmission of FIG. 1.

Referring to FIGS. 1, 2 and 3, a range type compound transmission 10 is illustrated. Compound transmission 10 comprises a multiple speed main transmission section 12, or more concisely, main section 12, connected in series with a range type auxiliary section 14, or more concisely range section 14. Transmission 10 is housed within a housing H and includes an input shaft 16 driven by a prime mover such as diesel engine E through a selectively disengaged, normally engaged friction master clutch C having an input or driving portion 18 drivingly connected to the engine crankshaft 20 and a driven portion 22 rotatably fixed to the transmission input shaft 16.

In main section 12, input shaft 16 carries an input gear 24 for simultaneously driving a pair of countershaft assemblies 26 at substantially identical rotational speeds. The two countershaft assemblies 26, which may be substantially identical, are illustrated on diametrically opposite sides of a mainshaft 28 which is generally coaxially aligned with input shaft 16. Each of countershaft assemblies 26 comprises a countershaft 30 supported by bearings 32 and 34 in the housing. Each of countershaft assemblies 26 is provided with a grouping of countershaft gears 38, 40, 42, 44, 46 and 48, fixed for rotation therewith. A plurality of mainshaft gears 50, 52, 54, 56 and 58 surround mainshaft 28 and are selectively clutchable, one at a time, to mainshaft 28 for rotation therewith by sliding clutch collars 60, 62 and 64, as is well known in the prior art. Clutch collar 60 may also be utilized to clutch input gear 24 to mainshaft 28 to provide a direct drive relationship between input shaft 16 and mainshaft 28.

Mainshaft gear 58 is the reverse gear and is in continuous meshing engagement with countershaft gears 48 by means of conventional intermediate idler gears (not shown). It should also be noted that while main section 12 does provide five selectable forward speed ratios, the lowest forward speed ratio, namely that provided by drivingly connecting mainshaft drive gear 56 to mainshaft 28, is often of such a high gear reduction it has to be considered a low or "creeper" gear which is utilized only for starting of a vehicle under severe conditions, and is not usually utilized in the high transmission range. Accordingly, while main section 12 does provide five forward speeds, it is usually referred to as a "four plus one" main section as only four of the forward speeds are compounded by the range section 14 utilized therewith.

With continued reference to FIG. 1, range section 14 includes two substantially identical range countershaft assemblies 74 each comprising a range countershaft 76 supported by bearings 78 and 80 in housing H and carrying two range countershaft gears 82 and 84 for rotation therewith. Auxiliary countershaft gears 82 are constantly meshed with and support a range input/main section output gear 86 that is fixed to mainshaft 28. Auxiliary section countershaft gears 84 are constantly meshed with an auxiliary section output gear 88 that surrounds transmission output shaft 90.

With specific reference to FIGS. 1, 2 and 3, range section 14 further includes a synchronized two-position range jaw clutch assembly 92. Jaw clutch assembly 92 is axially positioned by means of a range shift fork 94 (also illustrated in FIG. 3). Jaw clutch assembly 92 is rotatably fixed to output shaft 90 for rotation therewith. A range section shifting actuator assembly 96, or more concisely, a range actuator 96, is provided for clutching either gear 88 to output shaft 90 for low range operation, or gear 86 and mainshaft 28 to output shaft 90 for direct or high range operation of the compound transmission 10, as discussed in greater detail below.

With reference to FIG. 3, the shifting of gears in the main section 12 will be described in greater detail. Typically, clutch collars 60, 62 and 64 are axially positioned by means of shift forks 100, 102 and 104, respectively. Clutch collars 60, 62 and 64 may be of the well known synchronized or nonsynchronized double acting jaw clutch type.

Figure 4:
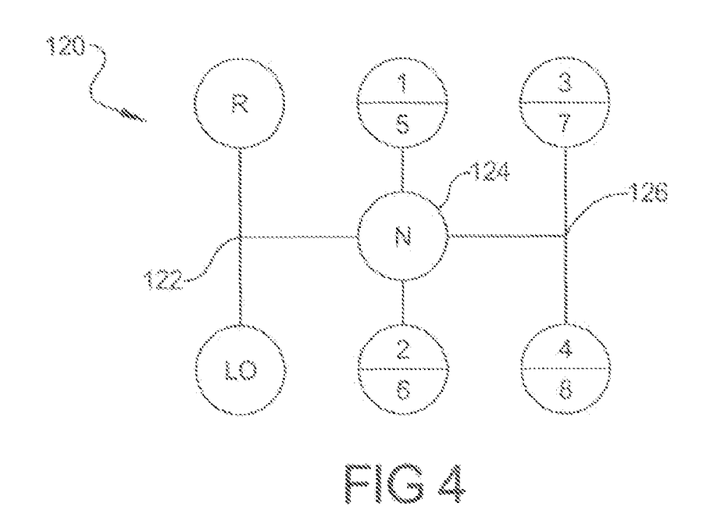
FIG. 4 is a schematic illustration of the shift pattern associated with the shift housing element of FIG. 3.

Clutch collars 60, 62, and 64 are three-position clutches in that they may be positioned, as illustrated in FIG. 1, in the centered nonengaged position, in a fore engaged position or in an aft engaged position by means of shift forks 100, 102, and 104 respectively. In the illustrated embodiment shift forks 100, 102, and 104 are integrated into a shift housing assembly 110. The shift forks 100, 102, and 104 extend from the shift housing assembly 110, to engage clutch collars 60, 62 and 64 and are controlled by a selector mechanism 112 positioned over housing assembly 110, as described below. Selector mechanism 112 is in turn controlled by an operator manipulated transmission input device, or shift lever, 114 (FIG. 2). Shift lever 114 is connected to selector mechanism 112 through an intermediate shift linkage 116, and may be disposed some distance from selector mechanism 112. Only one of the clutch collars 60, 62 and 64 is engageable at a given time, and a main section interlock means (not shown) may be provided to lock the other clutches in the neutral condition. The user manipulates lever 114 in order to shift main section 12. The user manipulates a switch 118 to shift range section 14. Switch 118 can be mounted anywhere convenient to the operator, and is commonly mounted in the knob of shift lever 114. This arrangement is well known in the prior art and is described in U.S. Pat. No. 5,216,931. Range shifting is permitted only when main section 12 is in neutral. The resulting shift pattern illustrated in FIG. 4 is known as a "repeat H" pattern. In an alternative embodiment, not illustrated but well known in the prior art as a "double H" shift pattern, the user need only manually manipulate shift lever 114 in order to shift both the main section 12 and the range section 14. This is achieved by integrating a range switch into the shift housing assembly. The precise shift pattern is not critical to the present invention.

Shift pattern 120 includes an R-LO throw position 122, a 1/5-2/6 throw position 124 and a 3/7-4/8 throw position 126. The first or top number in each position indicates a gear ratio sequence number when range section 14 is in low (LO). The second or lower number indicates the gear ratio sequence number when range section 14 is in high (HI). When the shift lever 114 is in LO-R shift throw position 122, movement of shift lever 114 displaces collar 64. Shift lever 114 may be moved in the fore direction to place the shift lever 114 in the R shift position. When shift lever 114 is in the R shift position, the main section 12 of the transmission 10 is in reverse R with the mainshaft gear 58 engaged with main shaft 28 by clutch collar 64. Similarly, when the shift lever 114 is in the LO-R shift throw position, shift lever 114 may be moved in the aft direction to place the shift lever 114 in the LO shift position. When shift lever 114 is in the LO shift position, the main section 12 of transmission 10 is in low gear LO with mainshaft gear 56 engaged with mainshaft 28 by clutch collar 64. Accordingly, when shift lever 114 is generally in LO-R shift throw position 122, transmission 10 is in the LO-R shift range. Shift lever 114 operates similarly when in the 1/5-2/6 and 3/7-4/8 throw positions 124 and 126. The neutral position in shift pattern 120 of FIG. 4 is anywhere on the horizontal line.

The overall transmission ratio between the speed of rotation of input shaft 16 and output shaft 90 is determined by a combination of the gear selected in main section 12 and the gear selected in range section 14. The H-shaped shift pattern defined by the portion of pattern 120 in alignment with positions 124 and 126 provides gears 1-4 when range section 14 is in Low, and gears 5-8 when range section is in HI. Repeating the shift pattern with the range section in HI and then in LO provides the full complement of ratios 1-8, and is the source of the "Repeat-H" shift pattern name.

Although range section 14 is illustrated as a two-speed section which may utilize spur or helical type gearing, it is understood that the embodiments presented herein are also applicable to range type transmissions utilizing combined splitter/range type auxiliary sections, having three or more selectable range ratios and/or utilizing planetary type gearing. Also, as indicated above, any one or more of clutch collars 60, 62 or 64 may be of the synchronized jaw clutch type and transmission sections 12 and/or 14 may be of the single countershaft type.

A PTO 130 is mounted to housing H and is engaged with range countershaft 74. PTO 130 has an output shaft 132 which may be coupled to any of several pieces of auxiliary equipment such as pumps. A typical PTO has a slideably engaging clutch which may be shifted to and out of an engaged or power mode remotely from inside the cab of the vehicle. For stationary PTO applications, such as operated hydraulics for raising and lowering an aerial lift bucket to enable access to overhead utility wires, it is highly desirable that the vehicle not move or lurch while the PTO 130 is being used. PTOs may alternatively be located so as to be driven by main section gears. However, when PTO 130 is driven by a range countershaft 74, it requires main section 12 be in gear to transmit torque to range countershaft 74. With main section 12 in gear, and transmitting torque through mainshaft 28 to countershaft 74, it is especially important that auxiliary section 14 remain in neutral.

Figure 5:
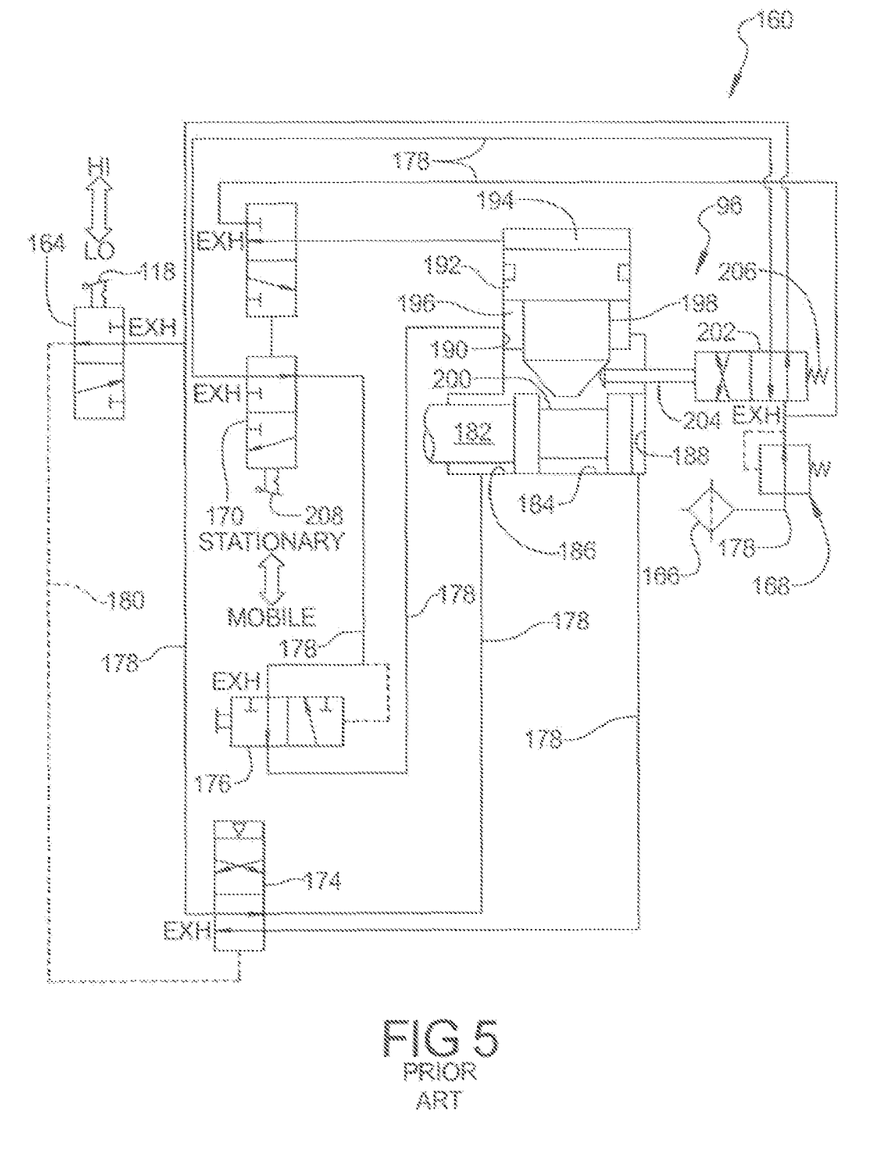
FIG. 5 is a schematic illustration of a prior art control circuit for the range section.

FIG. 5 schematically illustrates a prior art range selection control system 160. Control system 160 includes a master range valve 164, an air supply 166, an air filter and pressure regulator assembly 168, a stationary-mobile transmission control valve 170, a range slave valve 174, and a sequencing protecting valve/actuator assembly 176. The constituent elements of control system 160 are connected by pressure lines 178. Certain of the constituent elements are connected to exhaust (EXH) which connects to atmosphere.

Figure 7:
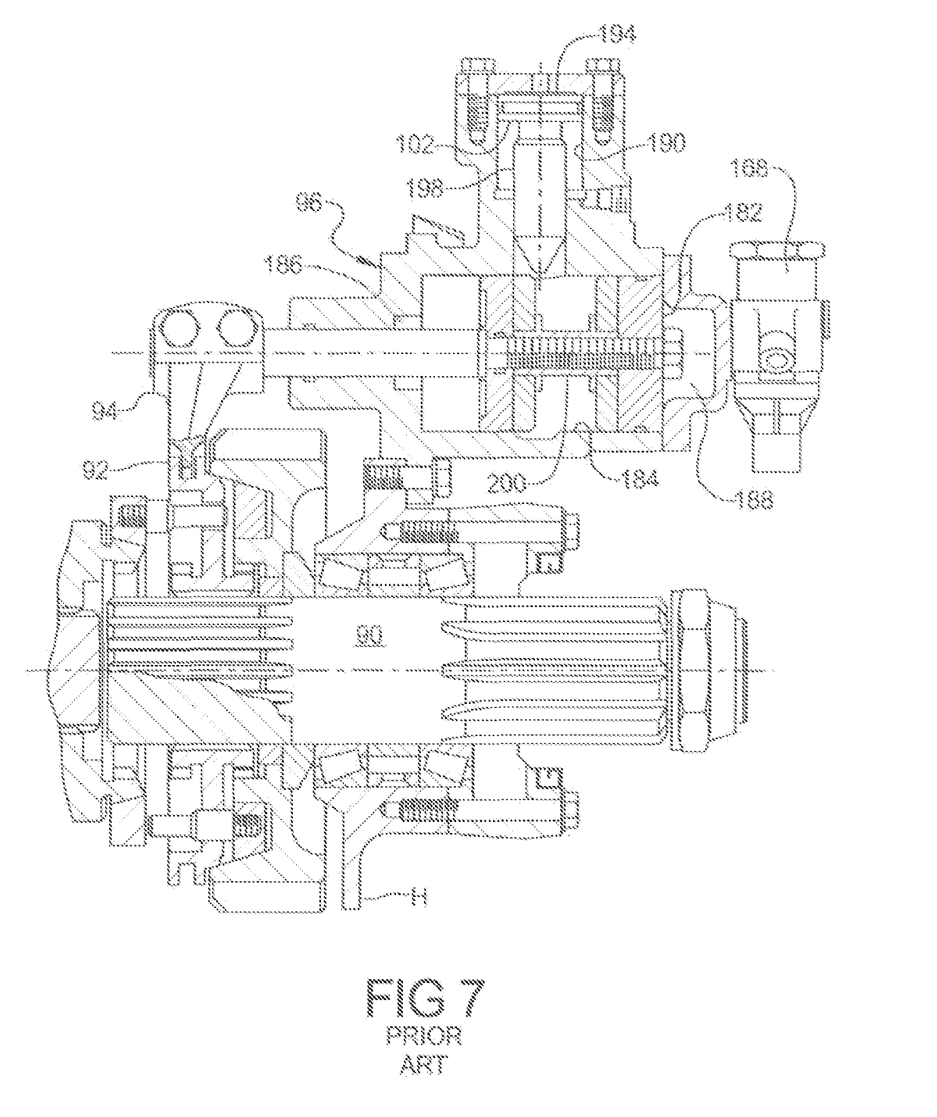
FIG. 7 is a sectional view of the prior art range actuator of FIG. 5.

Range actuator 96, best shown in FIG. 7, includes a range piston assembly 182 slidably disposed within a range cylinder 184. Ports to cylinder 184 communicate pressurized air to and from cylinder 184 to a low range chamber 186 and a high range chamber 188. A neutral cylinder 190 has a neutral piston assembly 192 slidably disposed therein. Neutral cylinder 190 intersects range cylinder 184 at a location enabling neutral piston assembly 192 to engage range piston assembly 182 and to retain range piston assembly 182 in the neutral position. Neutral cylinder 190 has ports for communicating pressurized air to and from a neutral chamber 194 and an engaged chamber 196. Pressurized air to neutral chamber 194 forces a neutral piston stem 198 into an engagement groove 200 defined by piston assembly 182. An air shut-off valve assembly 202 includes an engagement pin 204 biased into engagement with a tapered end of neutral piston stem 198 by a bias spring 206.

Connections between the system components are primarily made by pressure lines 178 that communicate fluid pressure. Pressurized air supply 166 is connected with filter/regulator assembly 168. Air shut-off valve assembly 202 is connected to filter/regulator assembly 168 by a pressure line at a first port, and to exhaust port EXH. In a first position shown in FIG. 5, valve assembly 202 provides a fluid flow path from filter/regulator assembly 168 to range slave valve 174, and stationary-mobile transmission valve 170 to exhaust port EXH.

Master range valve 164 is connected to air supply 166 via air filter and pressure regulator assembly 168 and air shut-off valve assembly 202. In heavy duty vehicles, the regulated air pressure is usually 60-80 psi. Switch 118 is effective to displace valve 164 and thereby pressurize or vent a pilot line 180 to range slave valve 174. Valve 174 is a two-position, four-way valve spring biased to the high-speed range position (i.e. high range chamber 188 is pressurized, and low range chamber 186 is exhausted) and responsive to pressurization of pilot line 180 to move to the low range position (chamber 186 pressurized and chamber 188 exhausted). Valve 174 interfaces with an interlock mechanism (not shown) which prevents movement of valve 174 unless the main section 12 is in the neutral condition.

Stationary-mobile transmission control valve 170 is connected to air supply 166 by two routes: via air filter and pressure regulator assembly 168 for the first route via air shut-off valve assembly 202, and for the second route, directly from air filter and pressure regulator assembly 168, bypassing valve assembly 202. In a first condition occurring only when neutral piston assembly 192 is in a retracted or disengaged position (as shown in FIG. 5), valve assembly 206 connects valves 164 and 174 to air supply 166, and valve 170 to exhaust. Shifting between the high and low range condition is permitted in this first condition. In a second condition, occurring only when piston assembly 192 is in the extended or engaged position, valve assembly 206 connects valves 164 and 174 to exhaust, and connects valve 170 to air supply 166. Valve 170 is a 3 way-2 position valve which has its position determined by operator selection. The vehicle operator displaces valve 170 through manipulation of a stationary-mobile switch 208. The two positions of valve are a stationary position (not shown) and a mobile position shown in FIG. 5. Neutral piston 192 engages range piston assembly to maintain range section 14 in neutral when PTO 130 is being operated to ensure that range section 14 does not become engaged in either the high mode or the low mode, and does not cause the vehicle to lurch or move in any way. To engage PTO 130 for stationary operation, the operator must: 1) depress the clutch pedal (not shown) to disengage the vehicle master clutch C and stop the vehicle; 2) set the parking brake (not shown) and place main section 12 in neutral with lever 114, enabling valve 174 to respond to controlling input from valve 164; 3) shift range piston assembly to the low range position using switch 118 if the range piston assembly 182 is not already in the low range (toward the right side of FIG. 5 and FIG. 7); 4) move stationary-mobile switch 208 to the "stationary" position, thereby connecting engaged chamber 196 with exhaust EXH via valve 176 and connecting neutral chamber 194 with air supply 166, enabling engagement of stem 198 with piston assembly 182 with movement of piston stem 198 past engagement pin 204 causing valve assembly 174 to move and connect chamber 186 with exhaust EXH thereby enabling piston assembly to move to an unloaded neutral position, and waiting for an indicator light to appear confirming that neutral piston assembly 192 is in the desired position; 5) shift the main section 12 to the desired gear with lever 114; 6) shift PTO 130 into engagement; 9) slowly release the clutch pedal to reengage the master clutch C. PTO 130 is now being driven by engine E through transmission 10. To release PTO 130, 1) disengage clutch C, waiting momentarily for PTO 130 to stop rotating; 2) shift main section 12 to neutral using lever 114 so that valve 174 will again be able to respond to switch 118 and valve 164; 3) shift PTO 130 out of engagement; 4) move switch 208 to the "mobile" position, thereby exhausting chamber 194 and connecting chamber 196 with air supply 166 to move neutral piston assembly 192 out of engagement with range piston assembly 182 and restoring air to valve 174, allowing control of piston assembly 182, and making certain the indicator light goes off; 5) release the clutch pedal, reengaging clutch C; and 6) release the parking brakes, in anticipation of moving the vehicle.

Figure 6:
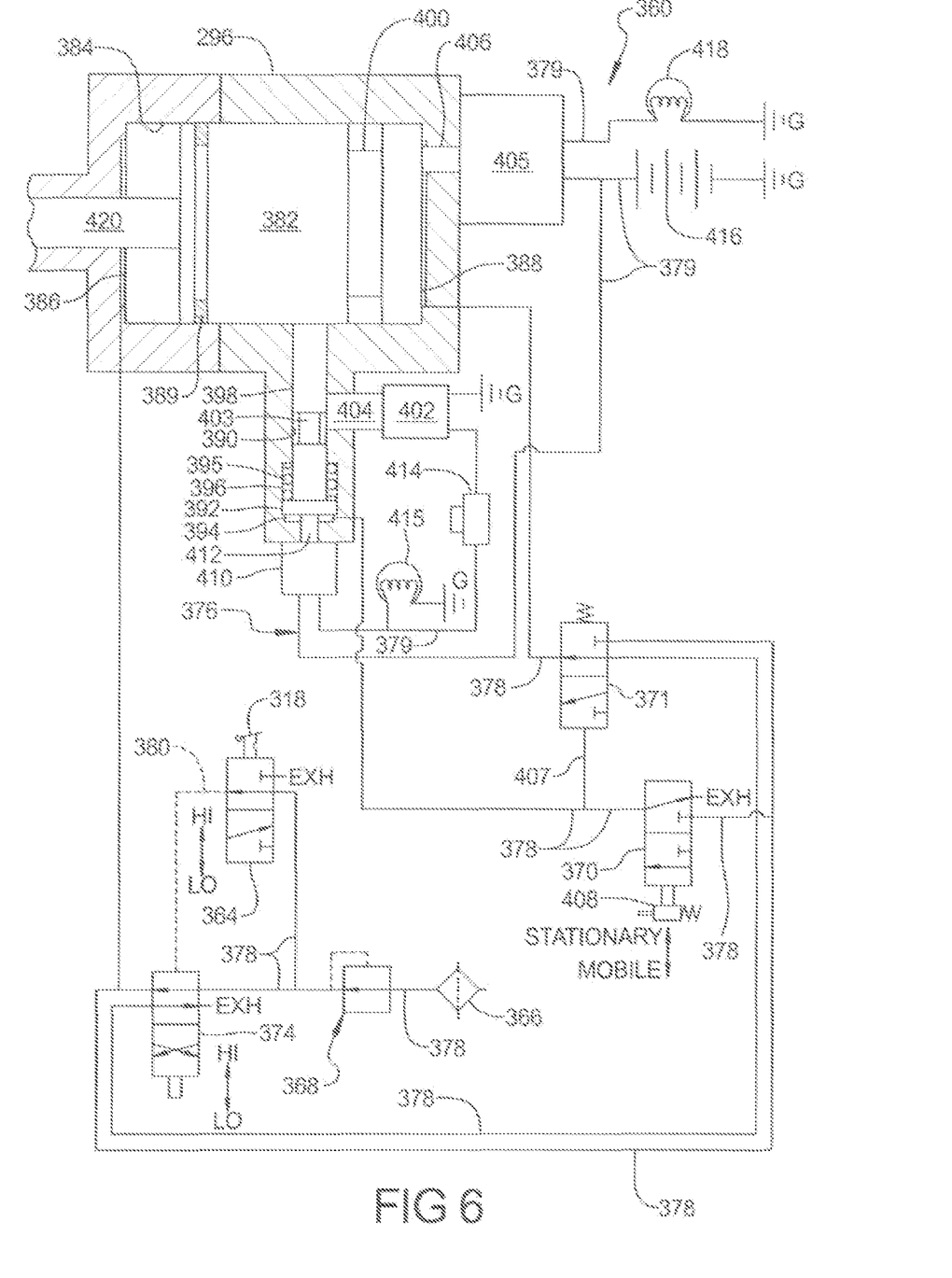
FIG. 6 is a schematic illustration of an exemplary control circuit for the range section.

FIG. 6 schematically illustrates the inventive range section control system 360. Control system 360 includes a master range valve 364, an air supply 366, an air filter and pressure regulator assembly 368, a stationary-mobile transmission control valve 370, a range slave valve 374, and an electric interlock system 376. The constituent elements of control system 360 are connected by pressure lines 378 and electrical conductors 379 as shown in FIG. 6. Certain of the constituent elements are connected to exhaust ports (EXH) or to ground G.

Figure 8:
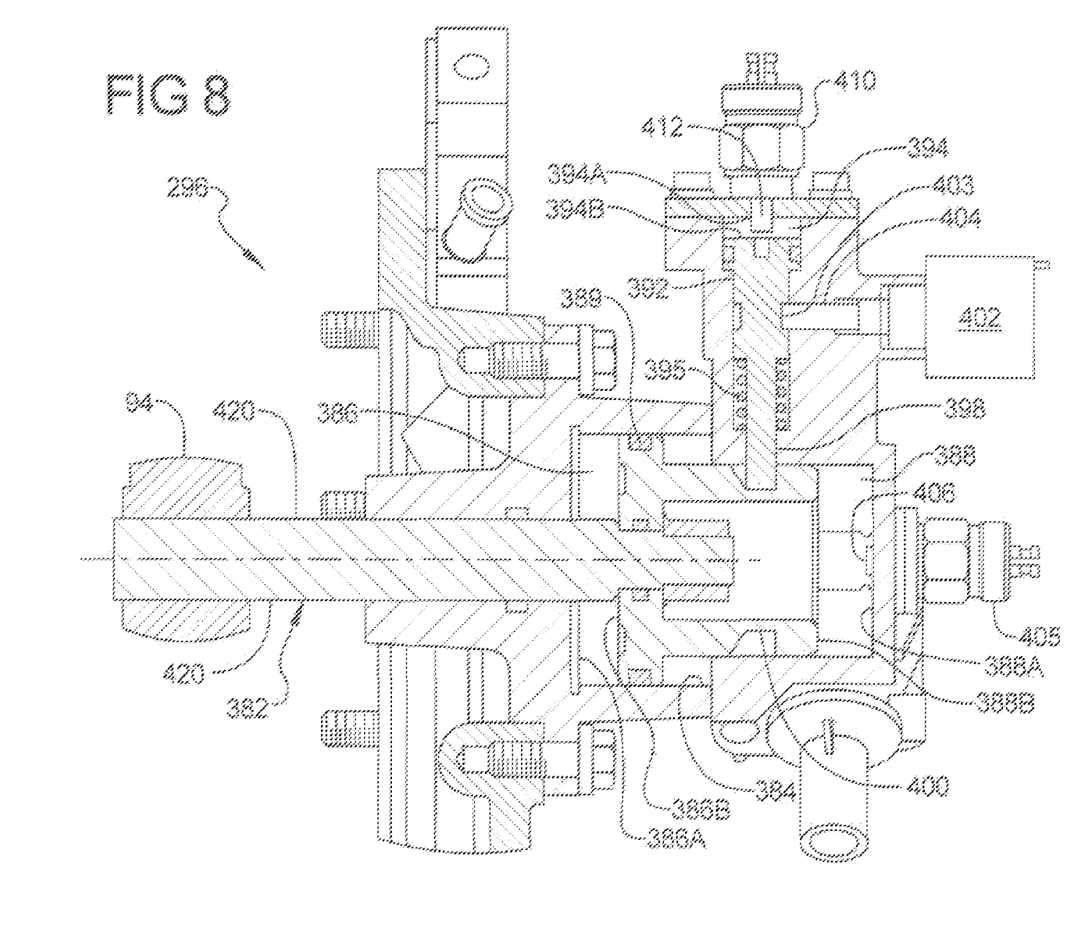
FIG. 8 is a sectional view of the exemplary range actuator of FIG. 6.

Range actuator 296, best shown in FIG. 8, includes a fluid actuated range piston assembly 382 slidably disposed within a range cylinder 384. Ports to cylinder 384 communicate pressurized air to and from a sealed low range chamber 386 and a sealed high range chamber 388. Range cylinder 384 and range piston assembly 382 define high range chamber 388 between a range cylinder first end 388A and a first surface 388B of piston assembly 382. Range cylinder 384 and range piston assembly 382 define low range chamber 386 between a range cylinder second end 386A and a second surface 386B of piston assembly 382. A neutral cylinder 390 has a fluid actuated neutral piston assembly 392 slideably disposed therein. Neutral cylinder 390 intersects range cylinder 384. Neutral cylinder 390 and neutral piston assembly 392 define neutral chamber 394 between a first neutral cylinder end 394A opposite range cylinder 384 and a neutral piston assembly side 394B. First neutral cylinder end 394A may be defined by a closure plate disposed at an end of the cylinder. The intersection of neutral cylinder 390 with range cylinder 384 at a location along an axis of cylinder 384 enables neutral piston assembly 392 to engage range piston assembly 382 and to retain range piston assembly 382 in the neutral position as described below. Neutral cylinder 390 has a port for communicating pressurized air to and from neutral chamber 394. A disengagement spring 395 is disposed in a spring chamber 396 incorporated into neutral chamber 394. Spring 395 biases piston assembly 392 away from piston assembly 382. Supplying pressurized air to neutral chamber 394 overcomes spring 395 and forces a neutral piston stem 398 of piston assembly 392 into an engagement groove 400 defined by piston assembly 382. A locking solenoid 402 includes a solenoid engagement pin 404 biased into engagement with an engagement groove 403 in neutral piston stem 398 when solenoid 402 is not energized. Solenoid 402 is a pull-type solenoid when energized, and must be energized to withdraw from groove 403.

The range actuator shifting feature is now described. Pressurized air supply 366 is fluidly connected with filter/regulator assembly 368. Master range valve 364 is connected to air supply 366 via air filter and pressure regulator assembly 368. Switch 318 is effective to selectively displace valve 364 to either a LO or a HI position and thereby respectively pressurize or vent a pilot line 380 to range slave valve 374. Valve 374 is a two-position, four-way valve spring biased to the high-speed range position (i.e. high range chamber 188 is pressurized, and low range chamber 186 is exhausted) and responsive to pressurization of pilot line 380 to move to the low range position (chamber 386 pressurized and chamber 388 exhausted). Valve 374 interfaces with an interlock mechanism (not shown) which prevents movement of valve 374 unless the main section 12 is in the neutral condition. Valve 374 is connected to air supply 366 via filter/regulator assembly 368. Valve 374 is also connected to exhaust EXH to enable venting to atmosphere. In a low mode (LO), shown in FIG. 6, valve 374 connects air supply 366 to chamber 386 and exhaust EXH to chamber 388. In this condition, piston assembly 382 moves to the right of FIG. 6, and range section 14 is placed in LO. In a high mode (HI), valve 374 connects air supply 366 to chamber 388 and exhaust EXH to chamber 386. In HI, piston assembly 382 moves to the left of FIG. 6, and range section 14 is placed in the high range. Shifting between the HI and LO is permitted so long as main section 12 is in Neutral.

The neutral locking feature is now described. The neutral locking feature has both a pneumatic portion and an electrical portion. The pneumatic portion is described first. Stationary-mobile transmission control valve 370 is connected to LO chamber 386, to range slave valve 374 and to neutral chamber 394. Valve 370 is controlled by a stationary-mobile switch located within the vehicle cab for convenient access by the vehicle operator. Valve 370 is also connected to slave valve 371. Valve 371 operates to connect neutral chamber 394 with LO chamber 386, and to provide pressurized air to valve 371 via pilot line 407 when valve 370 is in the "stationary" position (not shown). As shown in FIG. 6, valve 370 connects chamber 394 with exhaust EXH in the "mobile" position. Slave valve 371 is spring biased to the position shown in FIG. 6. Application of air pressure via a pilot line 407 displaces valve 371 to its second position (not shown) connecting chamber 388 with chamber 386. With regard to the electrical portion of the neutral locking feature, the system includes locking solenoid 402, a range low position switch 405, a range neutral switch 410 and a main section neutral switch 414. Elements of the electrical portion are connected by electrical conductors 379: Solenoid 402 is connected to electrical ground G and to range neutral switch 410. Switch 410 is mounted to a plate disposed over an end of neutral cylinder opposite range cylinder 384. Switch 410 is a normally closed switch with a plunger 412 biased toward piston assembly 392. When piston assembly 392 is in a non-neutral condition, that is, not in engagement with groove 400, plunger 412 engages piston assembly 392, which places switch 410 in an open condition. When piston assembly 392 enters groove 400 and piston assembly 382 is in the neutral position, plunger 412 extends fully, and switch 410 is in the closed condition. Switch 410 has a first terminal connected to an electrical power source 416, such as a vehicle's electrical system in series with a main section neutral switch 414. A second terminal of switch 410 is connected to a range neutral indicator lamp 415 and to a first terminal of main section neutral switch 414. A second terminal of switch 414 is connected to ground G. Main section neutral switch 414 is a normally closed switch incorporated into linkage 116, or housing assembly 110 or selector mechanism or any other appropriate element so as to provide an indication of when main section 12 is in neutral. Switch 414 is closed when main section 12 is in neutral, and is open when main section 12 is in gear. Such switches and means for mounting them are well known in the prior art. Switch 405 is mounted at an end of chamber 388 and oriented so that its plunger 406 has it travel restricted by piston assembly 382 when piston assembly is in the LO position as shown in FIG. 6. Plunger 406 is able to fully extend when piston assembly 382 is in the neutral and HI positions. Switch 405 is a normally open switch, closed when the plunger is held in, and open when the plunger 406 is allowed to fully extend. Switch 405 has one terminal connected to the electrical power source 416. A second terminal of switch 405 is connected to a range indicator lamp 418 placed in a location where the vehicle operator can see whether or not lamp 418 is illuminated. A second terminal of lamp 418 is connected to ground G. Lamp 418 illuminates when piston assembly 382 is in the LO position (all the way to the right as shown in FIG. 6), and is turned off by switch 405 when piston assembly 382 moves toward neutral and HI. Reference to lamp 418 may be made during by the operator in operating the vehicle, but it is not critical to the present invention. Lamp 418 and switch 405 may be omitted without adversely affecting function. Lamps 415 and 418 may be characterized as indicators, and can be in the form of any element that can be visually perceived by the vehicle operator, such as an incandescent lamp, an LED, an LCD or any other device capable of providing a visually perceptible signal.

Operation of the range section control circuit to engage and disengage the PTO 130 is now described. To engage the PTO for stationary operation, the operator must: 1) disengage the vehicle master clutch C and stop the vehicle; 2) place main section 12 in neutral and set the parking brake (not shown); 3) if the range piston assembly 382 is not already in the low range position (toward the right side of FIG. 6 and FIG. 8), shift range piston assembly 382 to the low range position by moving switch 318 to the LO position; 4) move stationary-mobile switch 408 to the "stationary" position, causing piston assembly 382 to move toward the HI position (to the left of FIG. 6) and piston assembly 392 to be forced into engagement with piston assembly 382; 5) wait for indicator lamp 415 to illuminate confirming that neutral piston assembly 392 has received by groove 400 and moved into the neutral position); 6) shift the PTO into engagement; 7) Shift the main section 12 to the desired gear; 8) slowly release the clutch pedal (not shown) to reengage the master clutch C. The PTO is now being driven by engine E through transmission 10. To release the PTO, 1) step on the clutch pedal to disengage the clutch, waiting momentarily for PTO 130 to stop rotating; 2) shift the main section 12 to neutral; 3) shift the PTO 130 out of engagement; 4) move switch 408 to the "mobile" position; 5) confirm that the indicator light 415 has been extinguished; 6) release the clutch pedal, reengaging clutch C; 7) release the parking brakes, in anticipation of moving the vehicle.

Figure 10:
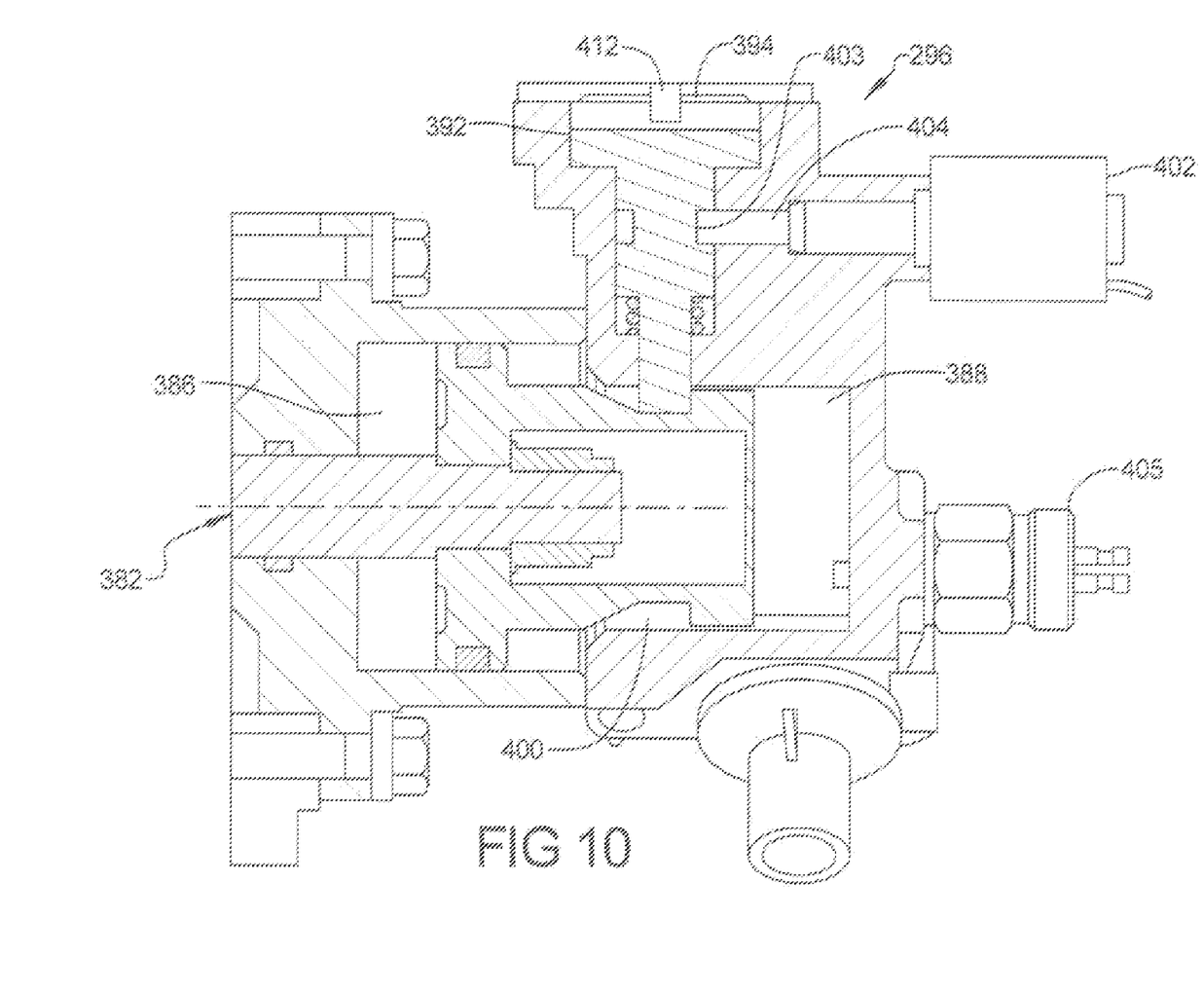
Figure 11:
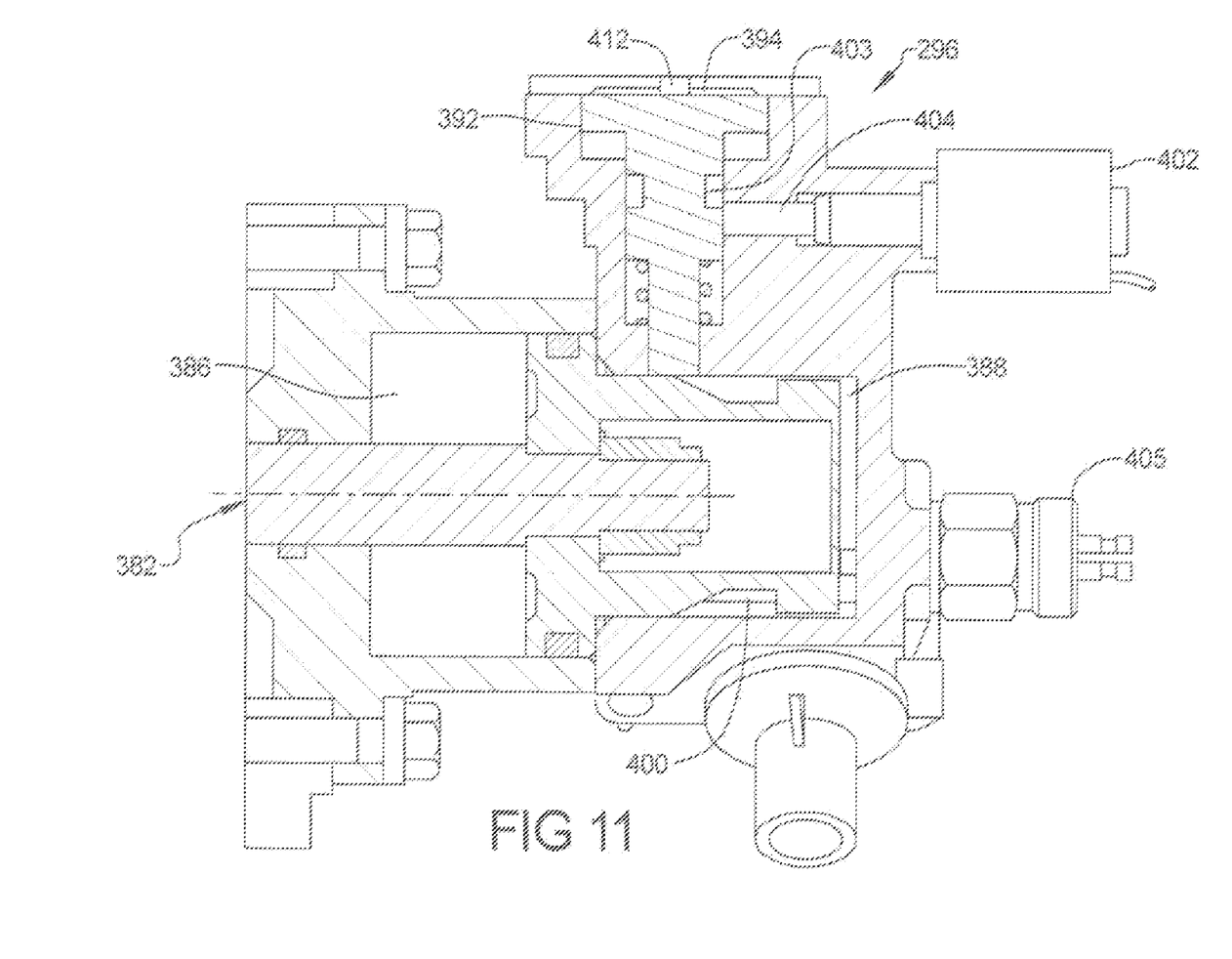

The detailed operation of the various elements within the circuit 360 during the processes of engaging and disengaging the PTO will now be described. Reference will be made to FIG. 6 and FIG. 8, as well as to FIGS. 9, 10 and 11 which respectively show range piston assembly 382 in the HI, neutral and LO positions. To engage the PTO 130, master clutch C is disengaged and the vehicle is stopped. This allows the shafts and gears of transmission 10 to come to a stop. Main section 12 is placed in neutral through the use of lever 114. Placing lever 114 in neutral causes switch 414 to move to the closed condition. Range section 14 is placed in the LO condition, illustrated in FIG. 6 and in FIG. 11. If it is necessary to shift range section 14 from the HI condition, illustrated in FIG. 9, the range actuator shifting feature must be employed. Switch 318 is moved from the HI position to the LO position.

Figure 9:
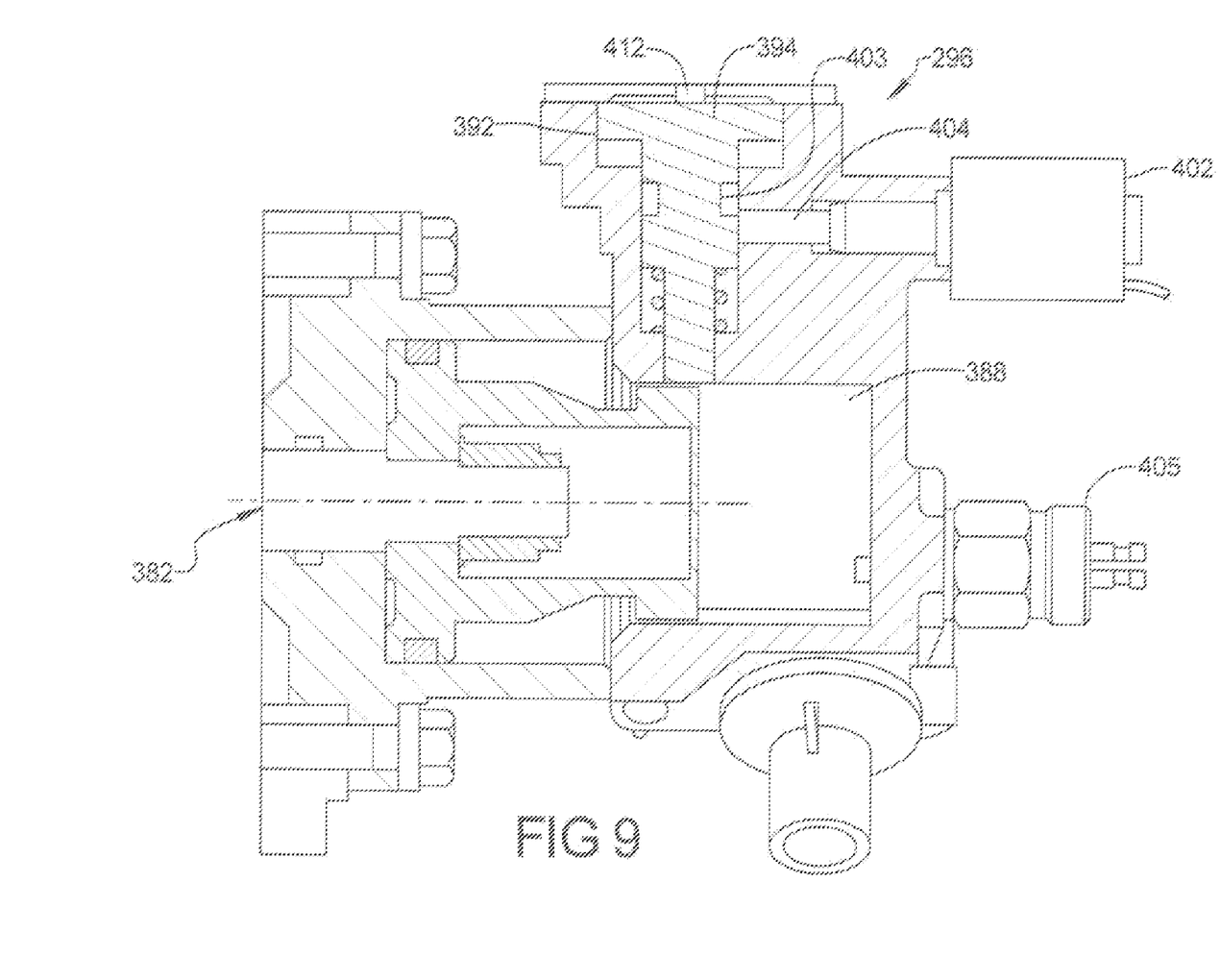
FIGS. 9, 10 and 11 are partial section views of the range actuator or FIG. 8, illustrating exemplary relative component locations during high-range, neutral and low-range modes of operation, respectively.

If the shift pattern is of the repeat H type, then switch 318 is actuated directly by vehicle operator. It the shift pattern is of the double H type, then switch 318 is actuated indirectly through shift linkage 116 by the vehicle operator moving the shift lever 114 past switch 318 to a LO location within the shift pattern and in the neutral position. With valve 364 in the HI position, pressure to pilot line 380 is blocked such that slave valve 374 is biased to the HI position, thereby connecting LO chamber 386 to exhaust EXH and routing pressurized air from air supply 366 to HI chamber 388 via valve 371. With LO chamber 386 connected to exhaust EXH and HI chamber 388 connected to pressurized air, piston assembly moves to and is held in the HI position, to the left of cylinder 384 as shown in FIG. 9. Moving switch 318 from HI to LO displaces valve 364 to the LO position, in turn feeding pressurized air to pilot line 380 and displacing valve 374 to the LO position shown in FIG. 6. With valve 374 in LO, chamber 386 receives pressurized air and chamber 388 is connected to exhaust, causing piston assembly 382 to shift all the way to the right of chamber 384 in FIG. 6 and FIG. 11. In vehicles equipped with switch 405 and lamp 418, lamp 418 would be illuminated. Once piston assembly 382 is in LO, the stationary-mobile switch 408 is moved from the "Mobile" position to the "Stationary" position, displacing valve 370 to a corresponding Stationary position. In the Mobile position, neutral chamber 394 is connected to exhaust EXH through valve 370, and no pressure is supplied to pilot line 407, allowing the spring bias force against valve 371 to keep it in a mobile position, connecting HI chamber 388 with valve 374. In the Stationary position, valve 370 connects valve 374 with neutral chamber and with pilot line 407. With valve 374 in the LO position, valve 370 directs pressurized air to both pilot line 407 and to chamber 394. Pressurized air chamber 394 biases piston assembly 392 against piston assembly 382, and displaces valve 371 to a Stationary position. In the Stationary position, valve 371 connects chamber 388 to pressurized air from air supply 366 via valve 374. In this condition, the pressure in both HI and LO chambers 388 and 386 is substantially the same. However, because of a cross sectional area of a range actuator piston shaft 420 of piston assembly 382, the effective area on the side of piston assembly 382 facing chamber 386 is less than the effective area facing chamber 388. The result of the area difference is a difference in force applied, with piston 382 being biased toward the HI direction. In a vehicle equipped with lamp 418 and switch 405, lamp 418 would be extinguished with movement of piston 382 away from the LO position. With a tip of piston stem 398 biased against piston 382, and piston 382 moving past stem 398, piston stem 398 is received by groove 400 when the two features are aligned. The whole of piston assembly 392 is displaced toward piston assembly 382, causing plunger 412 to be displaced by its internal spring bias and switch 410 to go to the closed condition. The disposition of the tip or end of piston stem 398 within groove 400 locks piston 382 into the neutral position shown in FIG. 10. With switch 410 closed, lamp 415 is illuminated. As switch 414 is already closed, closure of switch 410 also energizes solenoid 402, causing plunger 404 to be withdrawn by solenoid 402. The vehicle operator should check to ensure that lamp 415 is illuminated before proceeding. Once illumination of lamp 415 is confirmed, thereby confirming that range section 14 is in neutral, the PTO 130 is shifted into engagement, placing PTO 130 in its power transmitting mode. The precise means of doing this will depend on the PTO 130 itself. The main section 12 is shifted into the gear of choice, depending on the speed and torque that is desired to be transferred to PTO 130. Shifting main section 12 out of neutral opens switch 414, causing solenoid 402 to be deenergized, with plunger 404 being extended as a result. With piston stem 398 disposed in groove 400, the engagement groove 403 in stem 398 is aligned with and receives plunger 404 of the deenergized solenoid 402. Solenoid 402 and its plunger 402 serve as a safety lock, retaining piston assembly 392 and its stem 398 in engagement with groove 400 to maintain piston assembly 382 in the neutral position, and thereby preventing inadvertent engagement of range section 12 in either the HI or LO modes, and consequently preventing any unintended movement or lurching of the vehicle during operation of the PTO 130. The clutch pedal is now released to reengage master clutch C, providing driving torque to transmission 10 and torque to PTO 130. It is very important that range section 14 be in neutral before engaging PTO 130. That aside, there can be some variation in the above sequence. In particular, once master clutch C is disengaged, main section 12 can be shifted into a target gear at any point in the sequence before the master clutch C is reengaged.

To disengage PTO 130, the clutch pedal is depressed to disengage the clutch, interrupting the flow of torque to PTO 130. PTO 130, relieved of torque, is shifted out of engagement by the operator. Main section 12 is shifted to neutral by the operator, closing switch 414 and energizing solenoid 402 to withdraw plunger 404 from groove 403. Switch 408 is moved from the Stationary position to the Mobile position by the operator. Doing so moves valve 370 to the position shown in FIG. 6, in which air in chamber 388 and in pilot line 407 is opened to exhaust EXH. As a result, spring 395 displaces piston assembly 395 to a disengaged position, withdrawing stem 398 from groove 400. Also, with chamber 388 set to exhaust, and piston assembly 382 free to move within cylinder 384, pressure in chamber forces piston assembly 382 to the LO position. The operator should check that lamp 415 is extinguished, confirming that neutral piston assembly 392 is disengaged. If so equipped, lamp 418 will be illuminated with piston assembly 382 in the LO position. The clutch pedal is released to reengage the master clutch C.

Range actuator 296 and range control system 360 are superior to the prior art systems of the type illustrated in FIG. 5 and FIG. 7 because they have a positive double locking mechanism in the combination of pin 404 and groove 403 locking the retaining means of piston assembly 392 and groove 400. They 296 and 300 are also an improvement over the prior art in that by eliminating a valve, and simplifying the range actuator, the cost of the system is significantly reduced.

While the working fluid used in the illustrated embodiments is described as air, the fluid may be any suitable fluid including a liquid that is generally incompressible, and thus not pressurized as air, but displaced in reaction to an outside force or pressure. Furthermore, the application of the working fluid may be used to displace a piston, rotate an impeller, or to provide any other hydraulic/pneumatic to mechanical energy transfer. Additionally, while the control signals described herein are transmitted via a fluid such as air, to a device, such as a piston, the control signals may be transmitted via optical, electrical, or mechanical conveyances to suitable devices, although the control signals are preferably transmitted through movement of air.

The preceding description has been presented only to illustrate and describe exemplary embodiments of the methods and systems of the present invention. It is not intended to be exhaustive or to limit the invention to any precise form disclosed. It will be understood by those skilled in the art that various changes may be made and equivalents may be substituted for elements thereof without departing from the scope of the invention. In addition, many modifications may be made to adapt a particular situation or material to the teachings of the invention without departing from the essential scope. Therefore, it is intended that the invention not be limited to the particular embodiment disclosed as the best mode contemplated for carrying out this invention, but that the invention will include all embodiments falling within the scope of the claims. The invention may be practiced otherwise than is specifically explained and illustrated without departing from its spirit or scope. The scope of the invention is limited solely by the following claims.

We claim:

1. A range selection control system for a multispeed compound transmission facilitating the safe engagement and disengagement and operation of a power take off, the system having both fluid control elements and electrical control elements for use with a source of pressurized fluid and electrical power and comprising:
    a range cylinder having a range cylinder first end and a range cylinder second end;
    a fluid actuated range piston assembly slideably disposed within the range cylinder for movement between a low range position at the first end of the range cylinder and a high range position at the second end of the range cylinder and having a range engagement feature in the range piston assembly, the range cylinder and the range piston assembly defining a sealed high range chamber between the first end of the range cylinder and a first surface of the piston assembly and also defining a sealed low range chamber between the second end of the range cylinder and a second side of the piston assembly;
    a neutral cylinder intersecting the range cylinder having a first neutral cylinder end opposite the range cylinder;
    a fluid actuated neutral piston assembly slideably disposed within the neutral cylinder defining a neutral chamber between the first neutral cylinder end and a neutral piston assembly end facing the first neutral cylinder end, the neutral piston assembly engaging the range control piston assembly responsive to pressurization of the neutral chamber, the neutral piston assembly being received at least in part by the engagement feature when the range control piston assembly is in a neutral position between the low range position and the high range position, and the neutral piston assembly and neutral the cylinder together retaining the piston assembly in the neutral position; and
    an electrically responsive locking mechanism in selective locking engagement with the neutral piston assembly when the neutral piston assembly is received by the range engagement feature with the selective locking engagement being controlled by a condition of an electrical switch indicative of a transmission condition.

2. A system as claimed in claim 1, further comprising:
    the electrical switch is a first electrical switch configured and located to change between an open condition and a closed condition as the neutral piston assembly moves between the neutral position and the non-neutral position and to thereby indicate the location of the range control piston assembly in the neutral position and the switch in the condition corresponding to the neutral position causing the locking mechanism to engage the neutral piston assembly.

3. A system as claimed in claim 2, further comprising:
    a second electrical switch configured and located to change between an open condition and a closed condition responsive to a vehicle operator input moving the transmission shift lever between a neutral position and a non-neutral position and to thereby indicate whether the transmission shift lever is in the neutral position or the non-neutral position causing locking mechanism to disengage with the shift lever in the neutral position.

4. A system as claimed in claim 1, further comprising:
a lamp electrically connected to the first switch and the switch connecting the lamp to a source of electrical power when the first switch is in the condition corresponding to the neutral position of the neutral piston assembly.

5. A system as claimed in claim 4, further comprising:
a second electrical switch configured and located to change between an open condition and a closed condition responsive to a vehicle operator input moving the transmission shift lever between a neutral position and a non-neutral position and to thereby indicate whether the transmission shift lever is in the neutral position or the non-neutral position causing locking mechanism to disengage with the shift lever in the neutral position.

6. A system as claimed in claim 1, further comprising:
a stationary-mobile switch responsive to operator input for moving a stationary-mobile valve between a stationary position and a mobile position;
the stationary-mobile valve in the mobile position connecting both the neutral chamber and a slave valve pilot pressure line with exhaust and in the stationary position connecting both the neutral chamber and the slave valve pilot pressure line with pressurized fluid; and
the stationary-mobile slave valve in a first condition responsive to the slave valve pilot pressure line being connected to exhaust connecting the high range chamber with exhaust and in a second condition responsive to the slave valve pilot pressure line being connected to pressurized fluid connecting the high range chamber with pressurized fluid
wherein when the stationary-mobile switch is moved from the mobile position to the stationary position, the neutral piston assembly is biased into engagement with the range piston assembly and the range piston assembly is biased from the low range position toward the high range position and the neutral piston assembly is received by the engagement feature of the range piston assembly as the range piston translates toward the high range position stopping and holding the range piston assembly in the neutral position.

7. A system as claimed in claim 5, further comprising:
a stationary-mobile switch responsive to operator input for moving a stationary-mobile valve between a stationary position and a mobile position;
the stationary-mobile valve in the mobile position connecting both the neutral chamber and a slave valve pilot pressure line with exhaust and in the stationary position connecting both the neutral chamber and the slave valve pilot pressure line with pressurized fluid; and
the stationary-mobile slave valve in a first condition responsive to the slave valve pilot pressure line being connected to exhaust connecting the high range chamber with exhaust and in a second condition responsive to the slave valve pilot pressure line being connected to pressurized fluid connecting the high range chamber with pressurized fluid
wherein when the stationary-mobile switch is moved from the mobile position to the stationary position, the neutral piston assembly is biased into engagement with the range piston assembly and the range piston assembly is biased from the low range position toward the high range position and the neutral piston assembly is received by the engagement feature of the range piston assembly as the range piston translates toward the high range position stopping and holding the range piston assembly in the neutral position.

8. A system as claimed in claim 5, further comprising:
an indicator electrically disposed between the first switch and an electrical ground so that when the first switch is in the condition associated with the neutral position of the neutral piston assembly being the indicator provides a visually detectable signal.

\* \* \* \* \*